Figure 1:
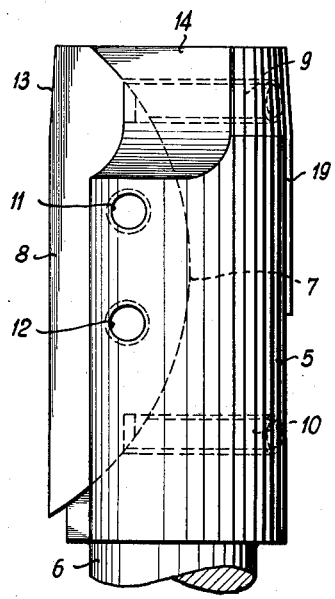

April 4, 1961     E. THOMA     2,977,829

MACHINE REAMER

Filed Feb. 29, 1956

INVENTOR

EUGEN THOMA

By *Erich M. H. Radde*

AGENT

United States Patent Office 2,977,829
Patented Apr. 4, 1961

2,977,829

MACHINE REAMER

Eugen Thoma, Aalen, Germany, assignor to Maschinen- und Präzisionswerkzeugfabrik G.m.b.H., Aalen (Wurttemberg), Germany, a corporation of Germany Filed Feb. 29, 1956, Ser. No. 568,663

Claims priority, application Germany Mar. 3, 1955

6 Claims. (Cl. 77—75)

It is known to construct machine reamers in such a way that the cutter blade is seated exchangeably in a carrier body generally of circular cross section in such a manner that the said blade in the form of a strip- or plate-shaped element is firmly clamped in a more or less radially disposed slot in the carrier body by means of screws.

Since reamers operate in a pilot hole, they require a certain amount of guidance in order to avoid eccentric running and thus the formation of a non-circular bore hole. Furthermore this guidance requires a measure of static definiteness in order that tipping of the reamer body about a given point shall be avoided.

For this purpose inter alia a three point suspension has been provided which is so arranged that the three guide points comprise the exchangeable cutter blade of the reamer and two guide elements distributed around the periphery of the carrier body.

The invention has for its object to provide further features and improvements in such constructions, and it consists in the fact that the three point support is formed by the edge of the relieved cutter blade arranged in the central plane of the carrier body, by a hard metal guide adjacent the back of the blade and a further hard metal guide arranged approximately diametrically opposite to the cutting edge.

By this arrangement of the cutting edge of the cutting blade in the mid-plane of the tool seizing or eccentric operation is avoided; further the blade is effectively relieved in such a way that a positive cutting angle is produced and "active" cutting is permitted and finally the two guide elements give a definite support in relation to the cutting edges in such a manner that the cutting pressure of the tool is absorbed in the optimum manner.

The application of two guides is known as above stated. In the arrangement according to the invention however it is important that the guides shall not be disposed at about 90° or 120° one from the other, as in the known arrangements, and thus remotely from the cutting edge, but that one of the guides shall be adjacent the back of the cutter blade. In this way it works at the same time as a reference face which, following the cutting edge, serves as a cut-controlling element so that it safely prevents penetration or "snatching" of the cutting edge into the wall of the bore to an unduly great depth.

Experience shows that a reamer constructed in the manner described operates in an extremely smooth and clean manner, is always guided to a satisfactory extent and hence produces comparatively little heat, so that instead of using expensive lubricating media the usual cooling liquids for example soap-water mixtures can be used without the cutting edge of the blade softening or losing its temper.

Figure 2:
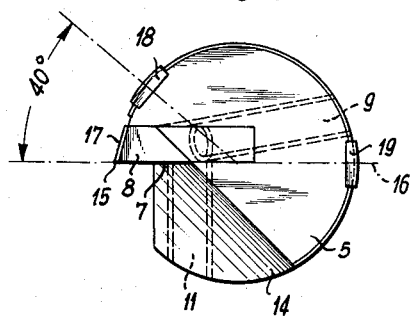

One constructional example of the present invention is shown by way of example on the accompanying drawing wherein:

Fig. 1 is a side view of the new machine reamer, while Fig. 2 is an end view thereof.

The carrier body proper 5 of the reamer which is connected at one end to a shank 6, is provided in the known manner with a guide slot 7 in which the reamer blade 8 is inserted, the guide slot having a curved base, as shown in broken line in Fig. 1. The adjustment of this blade to the required radius is effected by means of screws inserted in threaded apertures 9, 10 while the holding of the blade is effected by clamp screws which are inserted in threaded apertures 11, 12 transversely to the surface of the strip- or plate-shaped cutter.

The forward end 13 both of the blade 8 as also of the carrier body 5 is contracted somewhat to a cone shape for example at an angle of 3°. Moreover a chip chamber 14 is provided at the front end of the tool.

As will be seen in Fig. 2 the slot 7 and the blade 8 are so arranged that the cutting edge 15 of the latter lies in a mid plane 16 of the tool. The back 17 of the blade is relieved so that the cutting edge 15 engages the hole wall during cutting without the back contacting the hole wall.

A hard metal strip 18 is inserted in the carrier body 5 adjacent the back 17 of the blade and serving as a guide and said strip is arranged so that its outer radius corresponds to the path of the cutting edge 15. The position of the hard metal guide 18 may be determined empirically dependently on the particular conditions arising. Its distance from the cutter blade 8 must however be sufficiently small in order that the guide strip shall operate as a control face following the cutter blade. In general it has proved advantageous if the angle between the cutting edge 15 and the centre of the guide 18 is about 40°.

In the example shown on the drawing a second hard metal guide 19 is arranged diametrically opposite the cutting edge 15 of which the outer radius corresponds to that of the guide 18. It has been shown that, dependently in particular upon the diameter of the tool, the position position of the guide strip 19 requires a certain amount of correction particularly so that with increasing working pressures a slight change of position of the strip 19 in regard to the guide 18 is advisable. Nevertheless the principle shown in Fig. 2 must remain, namely that of the three bearing points guiding the carrier body 5, two of them, namely the cutting edge 15 and the guide strip 18 should be arranged adjacent one another while the third bearing point 19 should lie more or less opposite the other two points.

What I claim is:

1. Machine reamer comprising a carrier body, a cutter blade supported thereby and having only a longitudinally extending cutting edge, a first guide on said carrier body extending parallel to the edge of the cutter blade, the center line of the guide forming an angle of about 40° with the cutter blade edge, and a further guide running parallel to the cutter blade and approximately opposite thereto on the carrier body.

2. A machine reamer comprising a carrier body of circular cross section having a slot, a cutter blade supported in said slot and having only a longitudinally extending cutter edge and a relieved back abutting said edge, a first guide on said carrier body extending parallel to the cutter edge, said guide being in proximity with said relieved back and its center line being removed about 40° from said cutter edge, and a further guide running parallel to the cutter blade and approximately opposite thereto on the carrier body.

3. A machine reamer comprising a cylindrical cutter holder having an axially extending recessed housing for a cutter blade, a cutter blade having only a longitudinally extending cutter edge and a relieved back abutting said edge inserted in said housing, means retaining said blade in position in said housing, a first hard metal guide in the surface of said holder adjacent the relieved back, the center line of the guide being removed about 40° from the cutting edge, and a further hard metal guide in the holder approximately opposite the cutting edge.

4. A machine reamer comprising a cylindrical cutter holder having an axially extending recessed housing for a cutter blade, a cutter blade inserted in said housing, means for adjusting said blade in the housing, said cutting blade having only a cutting edge lying in a diametrical plane of the holder and a relieved back abutting the cutting edge, a first hard metal guide inserted in said holder parallel to the cutting edge and removed therefrom by an angle of about 40°, and a further hard metal guide inserted into the holder approximately opposite the cutting edge.

5. A machine reamer comprising a carrier body of circular cross section, an exchangeable cutter blade having only a longitudinally extending cutting edge and an abutting relieved back, and two guide elements inserted in the carrier body to provide a three-point bearing, said three-point bearing consisting of the cutting edge of the cutter blade arranged in the mid plane of the carrier body, a hard metal guide adjacent the cutter blade back, the center line of said guide being about 40° removed from the cutting edge, and a further hard metal guide disposed approximately diametrically opposite the cutting edge.

6. The machine reamer of claim 5, wherein the cutting edge constitutes the generatrix of a common surface for the hard metal guides.

References Cited in the file of this patent

UNITED STATES PATENTS

| | | |
|---|---|---|
| 552,065 | King | Dec. 24, 1895 |
| 619,450 | Turton | Feb. 14, 1899 |
| 1,414,565 | Gallagher | May 2, 1922 |
| 1,923,177 | Tucker | Aug. 22, 1933 |
| 2,092,984 | Muth | Sept. 14, 1937 |
| 2,391,794 | O'Brien | Dec. 25, 1945 |
| 2,606,464 | Fleischer | Aug. 12, 1952 |